US012226966B2

(12) United States Patent
Laberge Lebel et al.

(10) Patent No.: US 12,226,966 B2
(45) Date of Patent: Feb. 18, 2025

(54) PULTRUSION SYSTEM WITH COOLING STAGE AND METHOD THEREFOR (71) Applicant: POLYVALOR, LIMITED PARTNERSHIP, Montreal (CA)

(72) Inventors: Louis Laberge Lebel, Montreal (CA); Nawaf Abdulrahman Alsinani, Montreal (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 493 days.

(21) Appl. No.: 17/613,970

(22) PCT Filed: May 28, 2020

(86) PCT No.: PCT/CA2020/050728
§ 371 (c)(1),
(2) Date: Nov. 24, 2021

(87) PCT Pub. No.: WO2020/237381
PCT Pub. Date: Dec. 3, 2020

(65) Prior Publication Data
US 2022/0234313 A1    Jul. 28, 2022

Related U.S. Application Data
(60) Provisional application No. 62/854,612, filed on May 30, 2019.

(51) Int. Cl.
*B29C 70/52* (2006.01)
(52) U.S. Cl.
CPC .......... *B29C 70/528* (2013.01); *B29C 70/526* (2013.01)
(58) Field of Classification Search
CPC ... B29C 70/526; B29C 70/527; B29C 70/528; B29C 70/521; B29C 70/52
See application file for complete search history.

(56) References Cited

U.S. PATENT DOCUMENTS

| 2,609,312 A | * | 9/1952 | Farrell | D04B 1/225 |
| | | | | 264/103 |
| 3,665,068 A | * | 5/1972 | Duling | B29C 48/022 |
| | | | | 524/487 |

(Continued)

FOREIGN PATENT DOCUMENTS

| JP | H0679795 A | 3/1994 |
| JP | 2003145570 A | 5/2003 |
| WO | 2015169414 A1 | 11/2015 |

OTHER PUBLICATIONS

Kerbiriou, V. and K. Friedrich, Pultrusion of Thermoplastic Composites—Process Optimization and Mathematical Modeling, Journal of Thermoplastic Composite Materials, vol. 12 (Mar. 1999), pp. 96-120. (Year: 1999).*

(Continued)

*Primary Examiner* — Matthew J Daniels
(74) *Attorney, Agent, or Firm* — NORTON ROSE FULBRIGHT CANADA LLP (57) ABSTRACT

A system for pultruding a beam comprises a pulling mechanism continuously pulling on a preform of yarns including a thermoplastic matrix and fibers, the pulling mechanism being downstream of the system. A pultrusion die has a tapering channel portion heated such that the preform is at a desired low viscosity temperature for resin in the thermoplastic matrix to impregnate the fibers. A cooling tube is at a downstream end of the pultrusion die. A cooling module is spaced from the pultrusion die by the cooling tube, the cooling module to cool the cooling tube before the preform reaches the pulling mechanism, wherein the cooling tube defines a cooling channel. A pultrusion mandrel may be present.

18 Claims, 6 Drawing Sheets

(56) References Cited

U.S. PATENT DOCUMENTS

| | | | |
|---|---|---|---|
| 3,980,744 A * | 9/1976 | Cogswell | B29C 49/04 |
| | | | 264/209.3 |
| 3,993,726 A | 11/1976 | Moyer | |
| 5,540,797 A | 7/1996 | Wilson | |
| 10,589,468 B2 | 3/2020 | Trudeau et al. | |
| 10,913,220 B2 | 2/2021 | Laberge Lebel et al. | |
| 2018/0311917 A1* | 11/2018 | Klimovski | B29C 70/527 |

OTHER PUBLICATIONS

Jamiyanaa, K., Thermoplastic pultrusion development and characterization of residual in pultruded composites with modeling and experiments, Master of Science Thesis, University of Alabama at Birmingham (2014), title page through p. 14. (Year: 2014).*

B. J. Devlin, M. D. Williams, J. A. Quinn, and A. G. Gibson, "Pultrusion of unidirectional composites with thermoplastic matrices," Composites Manufacturing, vol. 2, pp. 203-207, 1991.

B. Ali, B. Bouiadjera, E. Chikh, and M. Elmeguenni, "The effect of the plastic instability on the behavior of an amorphous polymer," Mathematical Modelling of Engineering Problems, vol. 4, pp. 53-58, 2017.

C. Yan, Y. Shi, and L. Hao, "Investigation into the differences in the selective laser sintering between amorphous and semi-crystalline polymers," International polymer processing, vol. 26, pp. 416-423, 2011.

A. Oswald*, F.L. Lapointe*, L. Laberge Lebel, "Multi-Die, Vacuum Assisted Pultrusion of Flax/PLA Thermoplastic Biocomposite Rods". ECCM17—17th European Conference on Composites Materials, Jun. 26-30, 2016, Munich, Germany, 8 pp.

N. Alsinani and L. Lebel Laberge, "Effect of length variation of flax/polypropylene pellets produced by multi-die pultrusion on the quality of injection molded product.," presented at the Automotive Composites Conference & Exhibition (ACCE 2018), 2018.

F. Lapointe, A. Oswald, A. Nakai, and L. L. Lebel, "Manufacturing of Carbon/Polyamide Beam by Vacuum Assisted Pultrusion," in ECCM17-17th European Conference on Composite Materials, Munich, 2016, pp. 1-9.

M. B. Ghaedsharaf, J-E., Laberge Lebel, L., "Thermoplastic Composite Rod Manufacturing Rod Manufacturing using Biaxial Braid-Trusion", presented at the ECCM18—18th European Conference on Composite Materials, Athens, Greece, 2018.

F. Lapointe and L. Laberge Lebel, "Fiber damage and impregnation during multi-die vacuum assisted pultrusion of carbon/PEEK hybrid yarns," Polymer Composites, 2018.

K.-S. Kim, J.-C. Heo, and K.-W. Kim, "Effects of temperature on the microscale adhesion behavior of thermoplastic polymer film," Tribology letters, vol. 38, pp. 97-106, 2010.

G. L. M. Batch, C.W., "Analysis of Pressure, Pulling Force and Sloughing in Pultrusion", American Society of Mechanical Engineers, Heat Transfer Division, (Publication) HTD, vol. 132, pp. 109-112, 1990.

M. Ueda, N. Ui, and A. Ohtani, "Lightweight and anti-corrosive fiber reinforced thermoplastic rivet", Composite Structures, vol. 188, pp. 356-362, 2018.

A. Brack, S. Senger, G. Fischer, H. Janssen, J. Oertel, and C. Brecher, "Development of an artifact-free aneurysm clip", Current Directions in Biomedical Engineering, vol. 2, pp. 543-546, 2016.

M. Eichenhofer, J. C. Wong, and P. Ermanni, "Exploiting cyclic softening in continuous lattice fabrication for the additive manufacturing of high performance fibre-reinforced thermoplastic composite materials", Composites Science and Technology, vol. 164, pp. 248-259, 2018.

A. Memon and A. Nakai, "Mechanical properties of jute spun yarn/PLA tubular braided composite by pultrusion molding", Energy Procedia, vol. 34, pp. 818-829, 2013.

B. T. Astrom, Pipes, R.B., "A modeling approach to thermoplastic pultrusion. II: Verification of models," Polymer Composites, vol. 14/3, pp. 184-194, 1993.

G. Bechtold, Wiedmer, S., Friedrich, K., "Pultrusion of Thermoplastic Composites—New Developments and Modelling Studies," Journal of Thermoplastic vol. 15, 2002.

A. Carlsson, Astrom, B. T., "Experimental investigation of pultrusion of glass fibre reinforced polypropylene composites", Composites Part A, vol. 29, pp. 585-593, 1998.

I. Angelov, S. Wiedmer, M. Evstatiev, K. Friedrich, and G. Mennig, "Pultrusion of a flax/polypropylene yarn", Composites Part A: Applied Science and Manufacturing, vol. 38, pp. 1431-1438, 2007.

P. J. Novo, J. F. Silva, J. P. Nunes, and A. T. Marques, "Pultrusion of fibre reinforced thermoplastic pre-impregnated materials", Composites Part B: Engineering, vol. 89, pp. 328-339, 2016.

Dawson, D., "Curved pultrusion? No longer an oxymoron", Composites World, 2017, Viewed on Apr. 11, 2019 at: https://www.compositesworld.com/articles/curved-pultrusion-no-longer-an-oxymoron.

* cited by examiner

PULTRUSION SYSTEM WITH COOLING STAGE AND METHOD THEREFOR

CROSS-REFERENCE TO RELATED APPLICATION

The present application claims the priority of U.S. Patent Application No. 62/854,612, filed on May 30, 2019 and incorporated herein by reference.

TECHNICAL FIELD

The present application relates to a pultrusion system and to a method for pultruding beams using natural fibers or synthetic fibers, and the resulting pultruded beam reinforced by natural fibers or synthetic fibers.

BACKGROUND OF THE ART

Studies on pultrusion using natural fibers and/or biosourced matrices have demonstrated that biocomposite parts can be highly valuable for their mechanical properties, price and environmental benefits. In pultrusion, yarns of reinforcement fibers are fed into the system from a creel. Thermosets are added using a resin bath. Thermoplastics are fed into the system parallel to the reinforcement fibers or injected as melted pellets. When they are fed into the system parallel to the reinforcement fibers, they can be in the form of parallel yarns, comingled fibers, powder impregnated fibers or pre-impregnated tapes. Fibers and resin pass through a heated die of a certain cross-section shape. For thermoplastics, a tapered die entrance and resin overfilling are used to ensure pressure build-up for impregnation. A cooling system is added to prevent deconsolidation. The beam is pulled by a mechanism controlling the process speed.

Surface finish defects and deconsolidation have an impact on the commercial interest in pultruded products. Unlike thermoset composites, thermoplastic pultruded composites (TPCs) must be cooled while being constrained between mold surfaces. Otherwise, TPCs may deconsolidate in a porous structure having low mechanical properties. However, the thermoplastic polymer may tend to stick to metallic mold surfaces during cooling. This may create surface finish defects on pultruded products. Moreover, high thermoplastic polymer crystallinity requires specific temperatures and duration to be achieved. Unsolved post-impregnation challenges materialize in bad surface finish quality, sloughing and deconsolidation that results in high pulling forces. Indeed, when a thermoplastic polymer is cooled, it changes from a viscous flow state to a glassy state. During this change, the microscale adhesion behaviour of the thermoplastic polymer with metals can vary remarkably.

SUMMARY

It is an aim of the present application to provide a method for cooling pultruding beams of natural or synthetic fibers that addresses issues related to the prior art.

It is a further aim of the present application to provide a system for cooling pultruding beams of natural or synthetic fibers that addresses issues related to the prior art.

It is a further aim of the present disclosure to provide a method and system to pultrude and cool hollow beams.

It is a further aim of the present disclosure to provide a novel pultruded beam of natural fibers.

Therefore, in accordance with a first aspect of the present disclosure, there is provided a system for pultruding a beam comprising: a pulling mechanism continuously pulling on a preform of yarns including a thermoplastic matrix and fibers, the pulling mechanism being downstream of the system; and a sequence of at least one pultrusion die having a tapering channel portion heated such that the preform is at a desired low viscosity temperature for resin in the thermoplastic matrix to impregnate the fibers, a cooling tube at a downstream end of the pultrusion die, and a cooling module spaced from the pultrusion die by the cooling tube, the cooling module to cool the cooling tube before the preform reaches the pulling mechanism, wherein the cooling tube defines a cooling channel.

Further in accordance with the first aspect, for instance, the pulling mechanism comprises at least a pair of roller on opposite sides of the beam.

Still further in accordance with the first aspect, for instance, a pre-heating module pre-heats the preform upstream of the at least one pultrusion die.

Still further in accordance with the first aspect, for instance, the at least one pultrusion die includes a first pultrusion die, a vacuum module having a vacuum cavity to remove air from the preform exiting the first die, and at least a second pultrusion die to further impregnate the fibers.

Still further in accordance with the first aspect, for instance, the at least one pultrusion die has a taper in a range of 2° to 6° from a central axis of the tapering channel portion.

Still further in accordance with the first aspect, for instance, the at least one pultrusion die includes a straight channel portion downstream of the tapering channel portion.

Still further in accordance with the first aspect, for instance, the cooling tube is exposed to ambient.

Still further in accordance with the first aspect, for instance, the cooling module is displaceable along the cooling tube to vary a distance between the cooling module at the at least one pultrusion die.

Still further in accordance with the first aspect, for instance, at least one actuator displaces the cooling module relative to the cooling tube.

Still further in accordance with the first aspect, for instance, the cooling tube extends through the cooling module.

Still further in accordance with the first aspect, for instance, a longitudinal axis of the cooling tube is curved.

Still further in accordance with the first aspect, for instance, the cooling tube is integrally connected to the pultrusion die and extends therefrom.

Still further in accordance with the first aspect, for instance, the cooling module has at least one block defining another cooling channel, and wherein heating cartridges are in the at least one block.

Still further in accordance with the first aspect, for instance, a pultrusion mandrel extends in the at least one pultrusion die and the cooling channel.

Still further in accordance with the first aspect, for instance, the pultrusion mandrel has a thermal management core inside a forming sheath.

Still further in accordance with the first aspect, for instance, the thermal management core has a heating element forming a heating zone and a cooling element forming a cooling zone.

Still further in accordance with the first aspect, for instance, an actuator displaces the pultrusion mandrel relative to the pultrusion die and to the cooling channel.

Still further in accordance with the first aspect, for instance, the pultrusion mandrel has a variation of cross section.

In accordance with a second aspect of the present disclosure, there is provided a method for pultruding a beam comprising: continuously pulling on a preform of yarns including a thermoplastic matrix and fibers; while continuously pulling, sequentially impregnating the fibers by passing the preform through at least one pultrusion die having a tapering channel portion heated such that the preform reaches a desired low viscosity temperature for resin in the thermoplastic matrix, and cooling the preform by passing the preform in cooling tube downstream of the pultrusion die, and by passing the preform in a cooling module spaced from the pultrusion die.

Further in accordance with the second aspect, for instance, continuously pulling on the preform of yarns comprises pulling on the beam after the cooling to cause a continuous pull of the preform of yarns.

Still further in accordance with the second aspect, for instance, on the beam comprises passing the beam through at least a pair of roller on opposite sides of the beam.

Still further in accordance with the second aspect, for instance, the preform is pre-heated prior to passing the preform through the at least one pultrusion die.

Still further in accordance with the second aspect, for instance, impregnating the fibers includes passing the preform a tapering channel portion tapering in a range of 2° to 6° from a central axis of the die.

Still further in accordance with the second aspect, for instance, impregnating the fibers includes passing the preform through a straight channel portion downstream of the tapering channel portion.

Still further in accordance with the second aspect, for instance, the cooling module is moved along the cooling tube to vary a distance between the cooling module at the at least one pultrusion die.

Still further in accordance with the second aspect, for instance, impregnating the fibers and cooling the preform includes passing the preform around a mandrel, whereby the preform is a tube.

Still further in accordance with the second aspect, for instance, the mandrel is displaced relative to the pultrusion die and to the cooling channel.

In accordance with a third aspect of the present disclosure, a system for pultruding a beam comprises a pulling mechanism continuously pulling on a preform of yarns including a thermoplastic matrix and fibers, the pulling mechanism being downstream of the system; and a sequence of a pre-heating module to pre-heat the preform, at least one pultrusion die having a tapering channel portion heated such that the preform is at a desired low viscosity temperature for resin in the thermoplastic matrix to impregnate the fibers, and a cooling module to cool the beam before the beam reaches the pulling mechanism, and a pultrusion mandrel through the system.

Further in accordance with the third aspect, for instance, the pultrusion mandrel has a thermal management core inside a forming sheath.

Still further in accordance with the third aspect, for instance, the thermal management core has a heating element forming a heating zone and a cooling element forming a cooling zone.

Still further in accordance with the third aspect, for instance, an actuator displaces the pultrusion mandrel relative to the pultrusion die and to the cooling channel.

Still further in accordance with the third aspect, for instance, an actuator displaces the thermal management core relative to the forming sheath.

Still further in accordance with the third aspect, for instance, the pultrusion mandrel has a variation of cross section.

Still further in accordance with the third aspect, for instance, the pulling mechanism comprises at least a pair of roller on opposite sides of the beam.

Still further in accordance with the third aspect, for instance, the at least one pultrusion die includes a first die having a tapering channel portion heated such that the preform reaches a desired low viscosity temperature for resin in the thermoplastic matrix to impregnate the fibers, a vacuum module having a vacuum cavity to remove air from the preform exiting the first die, and at least a second die having a tapering channel portion heated such that the preform is at the desired low viscosity temperature for resin in the thermoplastic matrix to further impregnate the fibers, Still further in accordance with the third aspect, for instance, at least one of the first die and the second die has a taper in a range of 2° to 6° from a central axis of the tapering channel portion.

Still further in accordance with the third aspect, for instance, at least one of the first die and the second die includes a straight channel portion downstream of the tapering channel portion.

Still further in accordance with the third aspect, for instance, the system has a channel smaller in cross-section in the second die than in the first die.

In accordance with another aspect of the present disclosure, there is provided a method for pultruding a hollow beam comprising: continuously pulling on a preform of yarns including a thermoplastic matrix and fibers; while continuously pulling, sequentially passing the preform through at least one pultrusion first die having a straight or tapering channel portion heated such that the preform reaches a desired low viscosity temperature for resin in the thermoplastic matrix to impregnate the fibers, also passing around a mandrel having a straight, tapered or expanding cross-section, passing around the said mandrel having a heated and a cooled section along the length, passing the preform in cooling tube downstream of the pultrusion die, passing the preform in a cooling module.

In accordance with another embodiment of the present disclosure, the position of the components of the pultrusion system can be adjusted during pultrusion to control the profile thickness and pultrusion forces.

DETAILED DESCRIPTION

Figure 1:
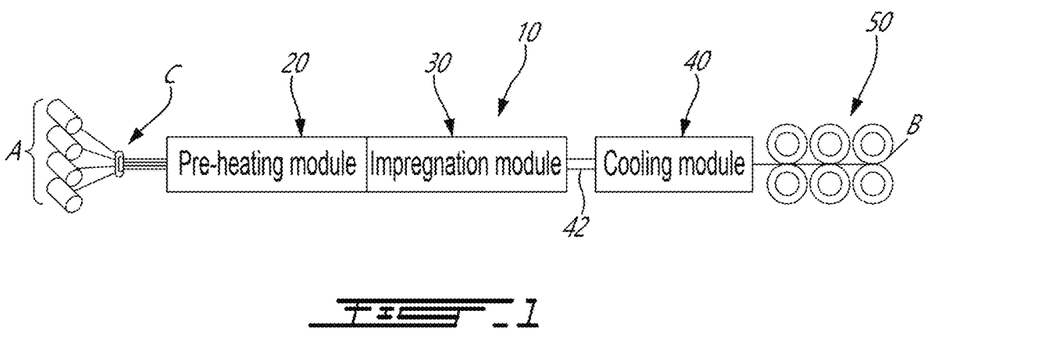
FIG. 1 is a schematic view of a pultrusion system with a cooling module in accordance with the present disclosure.
Figure 2:
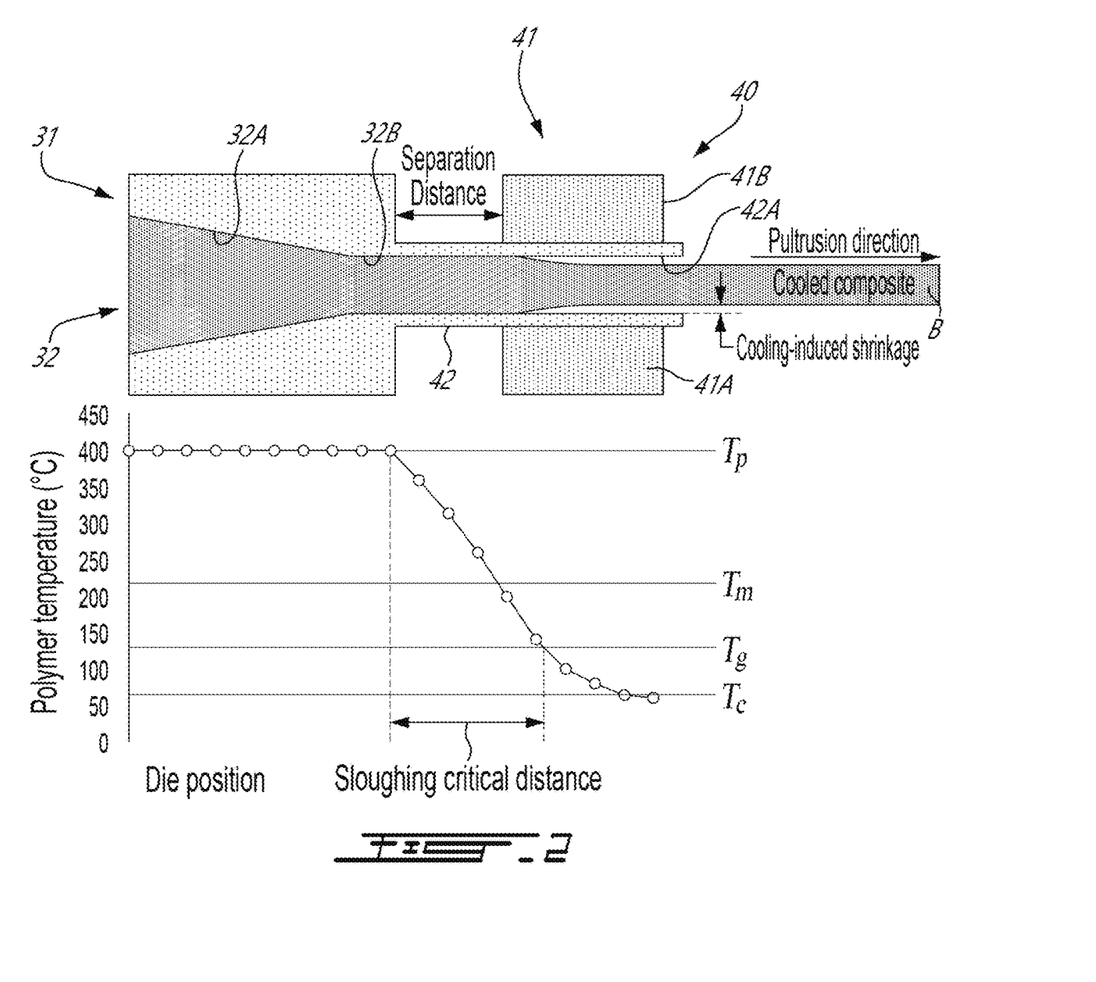
FIG. 2 is a schematic view of a pultrusion module and cooling module as part of the pultrusion system of FIG. 1, along with an exemplary temperature graph.

Referring to the drawings and more particularly to FIGS. 1 and 2, there is illustrated a pultrusion system 10 to operate a method for pultruding beams B including natural fibers in accordance with the present disclosure. The method therefore uses a preform of yarns A including a thermoplastic resin forming the matrix of the beam, and natural fibers used as reinforcement. However, even though the method is suited for the addition of natural fibers, it is considered to use synthetic fibers as well. As an example, the method and system 10 may use polylactic-acid (PLA) matrix as one of the yarns A, and a flax yarn as another one of the yarns A. For example, the PLA yarns may be trilobal 180 tex spun by Applied Polymer Innovations (from 4032D, NatureWorksLLC). This is one possible thermoplastic that may be used, as other thermoplastics, such as polypropylene, may be used as well, for this or for other natural fibers. Flax is a natural fiber that is well suited for being part of the present pultruded beam, due to its relatively low lignin content for high cellulose content, enabling higher process temperatures. Other natural fibers that may be used as well include hemp fibers and jute fibers, or mixes of natural fibers. Synthetic fibers can be used as well, such as glass fibers, carbon, etc, as well as mixtures of natural and synthetic fibers. The number of yarns A is determined by a nominal fiber volume content of 40%. Other materials that may be used for the yarns A include commingled yarns of carbon fibers and polyamide fibers (Dualon, Karijene Inc., Japan; Lexter, Mitsubishi Gas Chemical Inc., Japan).

Different types of yarn precursors can be used such as powder impregnated yarns where the reinforcing fibers are filled with polymer powder. Another type of precursor is a pre-impregnated tape where a fixed amount of reinforcement fibers are impregnated by a polymer. Other kind of yarns where the reinforcement fibers are mixed with the polymer can be used. Various arrangements are considered to feed the yarns to the system 10, such as having polymer yarns and reinforcement yarns on different spools, or as part of a parallel hybrid yarn. As another embodiment, comingled yarns of polymers and reinforcing fibers may also be used. As another embodiment, the reinforcement fibers may be sheath coated with a polymer sheath. As another embodiment, polymer fibers may be part of microbraided yarns.

In an embodiment, yarns A are fed from a creel into the system 10, as a possibility among others. A ring C may be used to ensure all yarns are aligned before entering the system 10. Yarn precursors are wound onto multiple spools and placed onto the creel. Yarns are tensioned by adjusting the friction between the spools and the creel. This tension keeps the yarns straight before they enter the pultrusion modules of the system 10.

The pultrusion system 10 may have or may not have a pre-heating module 20, an impregnation module 30 including pultrusion die(s), a cooling module 40, and a pulling mechanism 50 at the outlet of the cooling module 40 to exert the pulling action on the pultruded beam exiting from the cooling module 40. The various components of the modules 20, 30, and 40 of the system 10 may be arranged in a modular fashion, for example along rails to facilitate their handling and relative positioning and alignment.

If present, the pre-heating module 20 is used to pre-heat the yarns A entering the system 10, gradually and uniformly, to reduce the risk of degrading of the preform due to an abrupt temperature increase. As an example, a pre-heating module 20 that may be used is as described in PCT Application Publication No. WO 2017/219143, incorporated herein by reference. At the exit of the pre-heating module 20, the preform is heated to the point where the thermoplastic resin is in a near-liquid state, with high enough viscosity for the preform to remain integral, without significant dripping of the resin from the preform, without significant flowing to impregnate the reinforcement fibers. This may be achieved by an iterative control of the pre-heating parameters. Therefore, the preform enters the impregnation module 30 to be further heated and consolidated into a pultruded beam.

The impregnation module 30 is used for the impregnation of the natural fibers or synthetic fibers in the thermoplastics, to form a hot consolidated pultruded beam, by way of one or more pultrusion dies. The pultrusion dies can also be separated by heating ovens or heated vacuum chambers.

The cooling module 40 cools the hot pultruded beam at the exit of the impregnation module 30. In other words, the cooling module 40 may be referred to as a "heat extraction module", as the hot pultruded beam loses heat as it passes through the cooling module 40. As explained below, the cooling module 40 removes heat from a cooling tube in which the hot pultruded beam passes (a.k.a., the pultrudate, i.e., the material passing in the pultrusion system 10 and the result of the pultrusion). While the expression cooling is used, the cooling device 41 may have to be heated above ambient conditions, as the cooling of the pultruded beam is achieved at temperatures below those involved in the impregnation module 30, but nonetheless higher than ambient temperatures.

The pulling mechanism 50 is located at the outlet of the cooling module 40 to exert the pulling action on yarns A, becoming the pultruded beam B exiting from the cooling module 40.

Referring to FIG. 2, the impregnation module 30 is shown having a pultrusion die 31. The pultrusion die 31 may be standalone, or may be one of a plurality of pultrusion dies 31 of the impregnation module 30. For instance, the impregnation module 30 has two pultrusion dies 31 with a vacuum die therebetween, although it is possible to provide the system 10 with a single one of the pultrusion dies 31. Although the expression "vacuum die" is used, the vacuum component between the dies 31 could be called a vacuum chamber since there may be no contact with the pultrudate during passage through this section. Also, the vacuum chamber or die could be replaced or accompanied by a heated chamber without vacuum applied, essentially acting like an oven. The temperature is controlled, not necessarily at the polymer processing temperature. As another possibility, the impregnation module 30 may have a cascade of N pultrusion dies 31 separated by N−1 vacuum dies (e.g., N=3 or more). The pultrusion dies 31 may have a similar construction. For simplicity, a single pultrusion die 31 is described, if multiple pultrusion dies 31 are present the one being described is the downstream pultrusion die. The pultrusion dies 31 may be as described in PCT Application Publication No. WO 2017/219143. Hence, the pultrusion dies 31 may form a channel 32. The channel 32 may have a tapering channel portion 32A, with or without a subsequent straight channel portion 32B (which may instead be present in a cooling tube described below).

In an embodiment, the channel 32 has a circular section, such that the pultruded beam is a rod. The channel 32 may therefore have a frustoconical channel portion 32A or like tapering channel portion, followed up by a straight channel portion 32B downstream of the frustoconical channel portion 32A. In the illustrated embodiment, the tapering channel portion 32A is longer than the straight channel portion 32B, as the tapering is gradual to produce a change in sectional dimensions of the preform. For example, the tapering of the tapering channel portion 32A is between 2° and 6°, with the tapering channel portion 32A constituting roughly 80% (e.g., from 70-85%) of the overall length of the channel 32, the straight channel portion 32B taking up the remaining 20% of length (e.g., from 15-30%). The 2°-6° range represents the angle of the tapering wall relative to a central axis of the tapering channel portion 32A. The range between 2° and 6° is merely provided as an example at which the pultrusion method can suitably involve natural fibers. However, larger angles can be present, for instance up to 45°, and different shapes (other than cone) can be used such as ellipsoidal, rounded polymers, rounded cone, among possibilities. If there are multiple dies pultrusion 31, one difference between the similar dies 31 is the smaller size of the tapering channel 32, in a downstream direction of the pultrusion process. According to an embodiment, the diametrical dimensions are 2.5% smaller in the downstream die 31. For example, an upstream pultrusion die 31 may have a final diameter larger by 5 mm than a downstream pultrusion die 31, to let additional resin flow into the downstream pultrusion die 31, for overfilling purposes.

The die 31 is made of a material having suitable heat-transfer properties (e.g., a metal) as it must transmit heat to the preform passing in the tapering channel 32. According to an embodiment, continuous bores extend through the pultrusion die 31, to receive heating elements therein, or heating fluids by forming a fluid circuit. The heating elements or heating fluid in the bores will heat the base die 31, in such a way that the preform in the tapering channel 32 is heated by the surfaces of the tapering channel 32. Other bores may also be used for thermocouples, to monitor the temperature in the module. In an embodiment, 120V or 240V electric heating cartridges are used, capable of producing 350 W/m$^2$ for example. In another embodiment, external heating plates can be used over and under the die 31. The heating by the dies 31 allows the thermoplastic matrix to reach a sufficiently low viscosity. The temperature reached may be above the melting temperature of the thermoplastic for this purpose.

In an embodiment, the system 10 has a single-die impregnation module 30 with a single one of the pultrusion dies 31. For example, the single pultrusion die 31 may be 76 mm long, with a 5° taper in the tapering channel portion 32A, followed by the straight channel portion 32B being for example 20 mm long with a 4.78 mm constant diameter.

Figure 3:
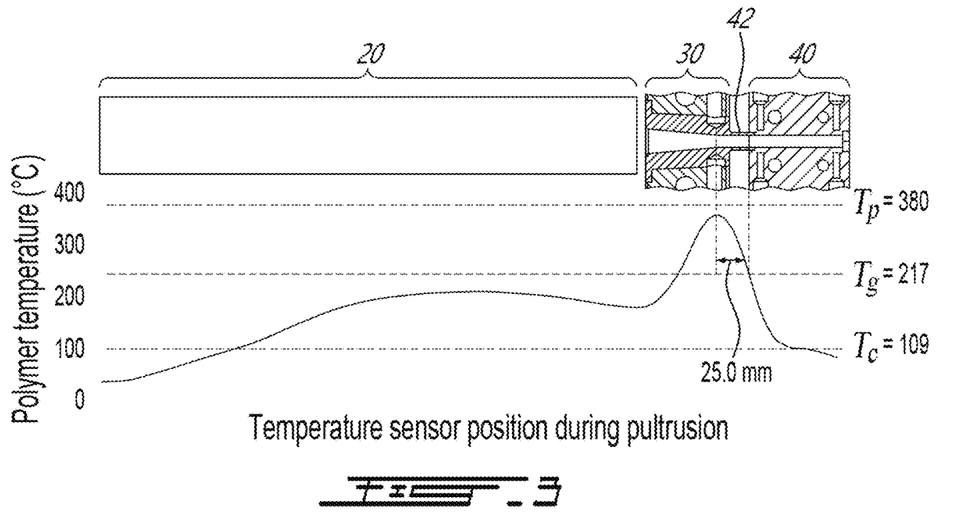
FIG. 3 is an exemplary embodiment of a temperature graph using the pultrusion system with cooling stage of FIG. 1, the temperature graph showing the temperature read by a temperature sensor following the pultrudate.

Referring to FIG. 2, the cooling module 40 is shown as having a cooling device 41. The cooling device 41 may have a similar construction to that of the other components of the system 10, with a base 41A and a cover 41B, though this is not necessary. The cooling device 41 may surround a cooling tube 42, that defines a cooling channel 42A. The cooling tube 42 is shown as being part of the cooling module 40, in that cooling of the pultruded beam occurs in the cooling tube 42, in spite of the fact that, in an embodiment, the cooling tube 42 may be integrally connected the impregnation module 30. The cooling tube 42 may be a thin-walled extrusion for instance of thickness ranging between 0.05 and 100 mm-100 mm being for larger beams-, for an internal diameter ranging between 0.1 and 2000 mm, in the case of a circular cross section, but with equivalent cross-sectional areas if the cross section is not circular. In an embodiment, the cooling tube 42 defines a closed section, e.g., circular, rectangular, or other, in continuation with that of the pultrusion die 31. The cooling tube 42 may project continuously from the pultrusion die 31. Stated differently, an inner diameter is preserved from the straight channel portion 32B to the cooling channel 42A. In an embodiment, the cooling tube 42 is integral with the pultrusion die 31, i.e., it is made with the same material and may be monoblock with it. Another assembly is considered in which the cooling tube 42 is fitted into the die 30 with a holding system such as a pipe compression fitting. The tube 42 and the die 30 may hence be two different metal parts that are mechanically joined together (e.g., welded, brazed, etc). The cooling tube 42 is surrounded by an air gap (e.g., ambient), fluid gap, or lower heat-transfer material, such that a heat sink between modules 30 and 40 is small. The cooling tube 42 may then contact the cooling device 41 and may even penetrate it as shown in FIGS. 2-5. In an embodiment, the cooling tube 42 abuts against an upstream surface of the cooling device 41 or penetrates partially into the cooling device 41, with the cooling device 41 defining its own cooling channel 42A (FIG. 3).

Pultruded materials previously heated at processing temperature in the pultrusion die 31 are pulled through the cooling tube 42. Heat is extracted from the pultruded product by the cooling tube 42 via its cooling with the cooling device 41, installed on the cooling tube 42 and/or downstream of the cooling tube 42 at a predetermined distance from the pultrusion die 31. This cooling system, defined by the cooling device 41 and the cooling tube 42, may provide an accurate control on the thermal profile on the surface of the pultruded product, therefore enabling an improvement of the surface finish quality. In an embodiment, the beam cools sufficiently while in the cooling tube 42 upstream of the cooling device 41, such that it contracts so as not to rub against the surface of the channel 42A when in the cooling device 41. The separation distance between the die 31 and the cooling device 41, resulting from the use of the cooling tube 42 allows cooling to occur without deconsolidation. In addition, the arrangement of FIGS. 2 and 3 may allow the hot molten polymer mixture to develop a controlled semi-crystalline microstructure due to the accurate cooling temperature profile control. Accordingly, whether the cooling tube 42 extends continuously or not through the cooling device 41, the pultrusion is cooled sufficiently to contract before it may come into contact with any surface disruption or seam in the cooling channel 42A.

Figure 6:
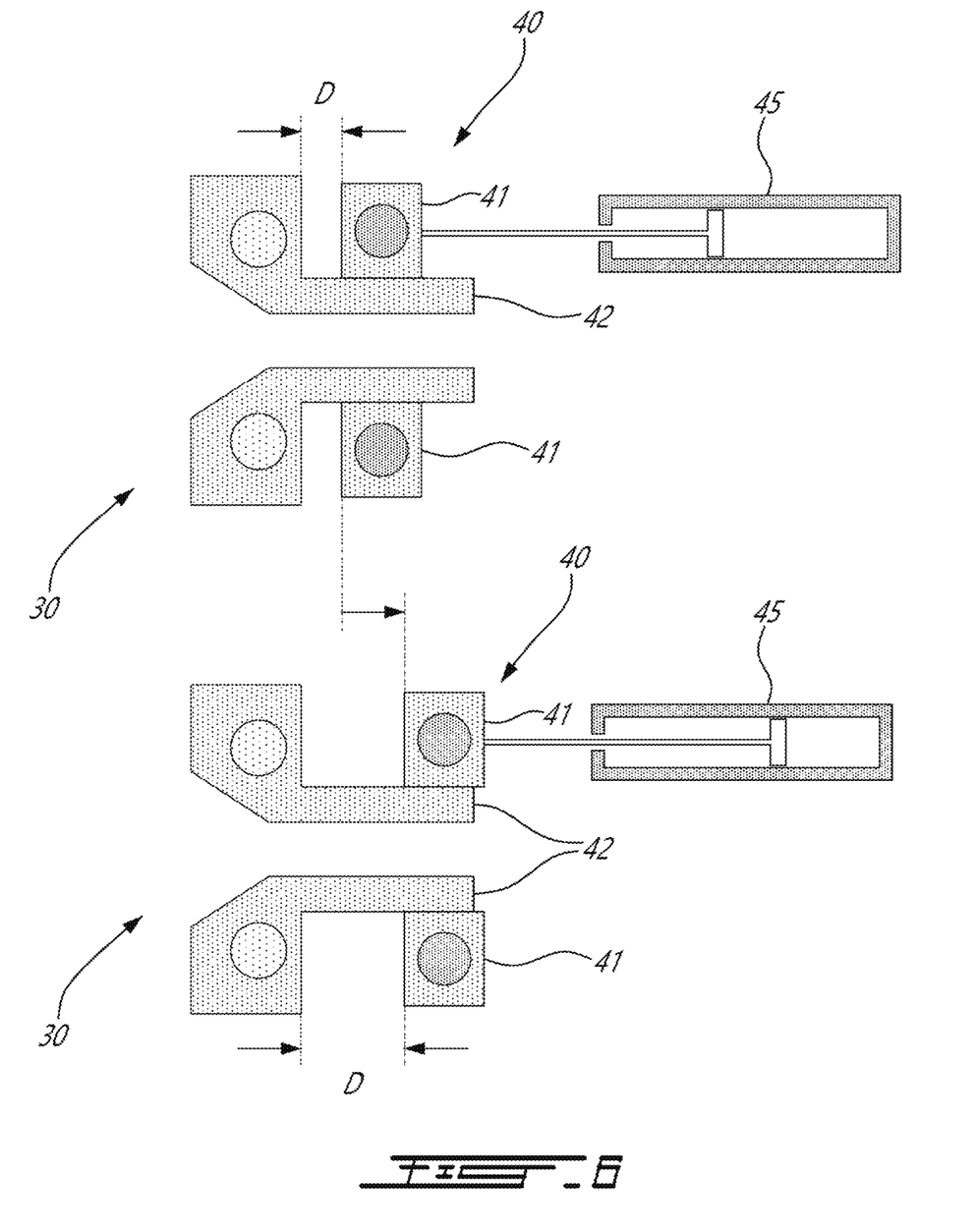
FIG. 6 is a schematic view the pultrusion module and cooling module as part of the pultrusion system of FIG. 1, with relative movement of the cooling module.

Referring to FIG. 6, the cooling module 40 may be configured to vary a separation distance D between the pultrusion die 31 and the cooling device 42. For example, this is achieved by allowing the cooling device 42 move relative to the cooling tube 42. This variation of the separation distance D may be performed to accurately control the cooling temperature profile of the pultruded product. The distance can be adjusted mechanically in response to a sensor(s) reading(s), with the sensor(s) including one or more of a surface profilometer and/or a pultrusion pulling force sensor, as examples. The variation of the separation distance D can also be adjusted in relation to the pultrusion speed, as an example. A short separation distance will accelerate the cooling. The pultruded beam or rod will shrink and de-bond from the cooling channel faster. This will reduce the pulling forces generated by the pultrusion system 10. On the other hand, a long separation distance will slow the cooling. The pultruded beam will be in contact for a longer time with the cooling channel surface, thus creating higher pultrusion forces. The longer exposition at hotter temperature will enhance the crystallization of a semi-crystalline thermoplastic polymer. Hence, a variation of the separation distance D may be adjusted as a function of the desired surface finish. This may done during the pultruding, for instance as a response to a variation of pulling speed. The mechanical adjustments may be done using appropriate actuator(s) 45, such as linear actuators including electro-mechanical actuators, pneumatic cylinders, hydraulic cylinders. Position adjustment mechanisms, including sets of screws and bolts, may also be used, for instance for manual mechanical adjustment. For example, the adjustment may be done at the beginning of a new batch and/or adaptively during the pultrusion of the batch.

In an embodiment, the cooling channel 42A has a circular section, like other components of the system 10. Likewise, the components of the system 10 may produce beams in a variety of cross-sections, including square, rectangular, polygonal, oval, U, I, just as examples. The base 41A, the cover 41B, the cooling tube 42 are made of materials having suitable heat-transfer properties, i.e., low longitudinal thermal conductivity, (e.g., a metal) as they must cool the beam passing in the cooling channel 42A. According to an embodiment, the base 41A and cover 41B have bores 43A and 43B (FIGS. 3 and 4) in their side walls, to form bores extending through the cooling device 41, to receive cooling elements therein (FIG. 4), or cooling fluids. Other bores may also be used for thermocouples, to monitor the temperature in the module 40. The cooling elements (e.g., fluid coils for cooling fluid) in the bores 43A and 43B will heat the base 41A and cover 41B, in such a way that the preform in the cooling channel 42A is cooled by the surfaces of the channel 42A, whether they be defined totally by the cooling tube 42 or also by the cooling device 41. In an embodiment, the cooling elements are 120V or 240V electric heating cartridges, capable of producing 450 W/m$^2$ for example. In an embodiment, the cooling element is the bore 43A is warmer than the cooling element in the bore 43B.

Figure 7:
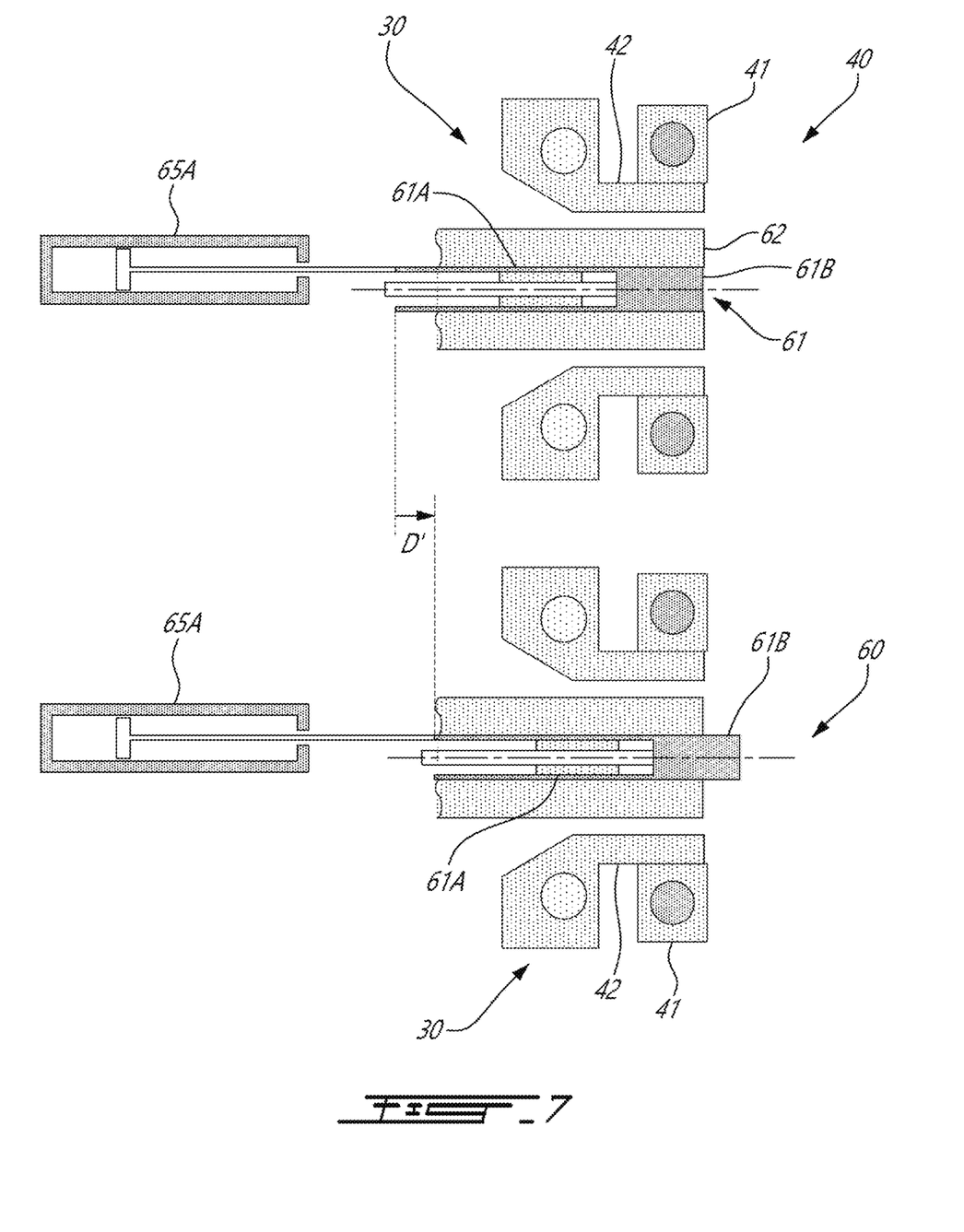
FIG. 7 is a schematic view of the pultrusion module and cooling module as part of the pultrusion system of FIG. 1, with a pultrusion mandrel for forming pultruded tubes.

Referring to FIG. 7, an embodiment of the pultrusion system 10 is shown, in which the system 10 has the capacity to pultrude hollow profiles, a.k.a., tubes. In this case, the pultrusion system 10 is equipped with a pultrusion mandrel 60. The pultrusion mandrel 60 is attached to and supported at the upstream end of the system 10, such as before the pre-heating die 20. For simplicity, only the portion of the pultrusion mandrel 60 in the impregnation module 30 and cooling module 40 is shown, but the pultrusion mandrel 60 extends upstream to be present in the pultrusion system 10 as the yarns A penetrate the pre-heating die 20, for the yarns A to be distributed in a hollow arrangement. The mandrel 60 may be composed of a thermal management core 61 incorporated into a forming sheath 62 (e.g., a tube) that comes into contact and shapes the pultruded beam. In an embodiment, the thermal management core 61 may have a heating component(s) 61A forming a heating zone, and a cooling component(s) 61B defining a cooling zone. The thermal management core 61 may be free to move relative to the forming sheath 62, to adjust a position D' of the heating zone and the cooling zone relative to the forming sheath 62 and thus relative to the dies of the various modules 20, 30 and 40. In an embodiment, the position of the thermal management core 61 may be adjusted during pultrusion to modify the cooling temperature profile of the inner surface of the hollow pultruded profile, for example. The change of position may be as a function of the pultrusion parameters, such as the pultrusion speed and/or sensor readings on temperature, etc. The mechanical position adjustments of the thermal management core 61 and/or of the forming sheath 62 may be done using appropriate actuator(s) 65A for the core 61 and/or 65B for the sheath 62, such as linear actuators including electro-mechanical actuators, pneumatic cylinders, hydraulic cylinders. The actuators 65A and 65B are shown in separate figures, i.e. FIGS. 7 and 8, but may be present concurrently to allow relative movement between core 61 and sheath 62. A position adjustment mechanism(s), including sets of screws and bolts, may also be used, for instance for manual mechanical adjustment. For example, the adjustment may be done at the beginning of a new batch and may be adjusted during the pultruding. In an embodiment, such components access the thermal management core 61 via the upstream end of the system 10, as may do the pipes or conduits that can direct coolant or wires that may power to the component(s) 61A and to the cooling component(s) 61B.

Figure 8:
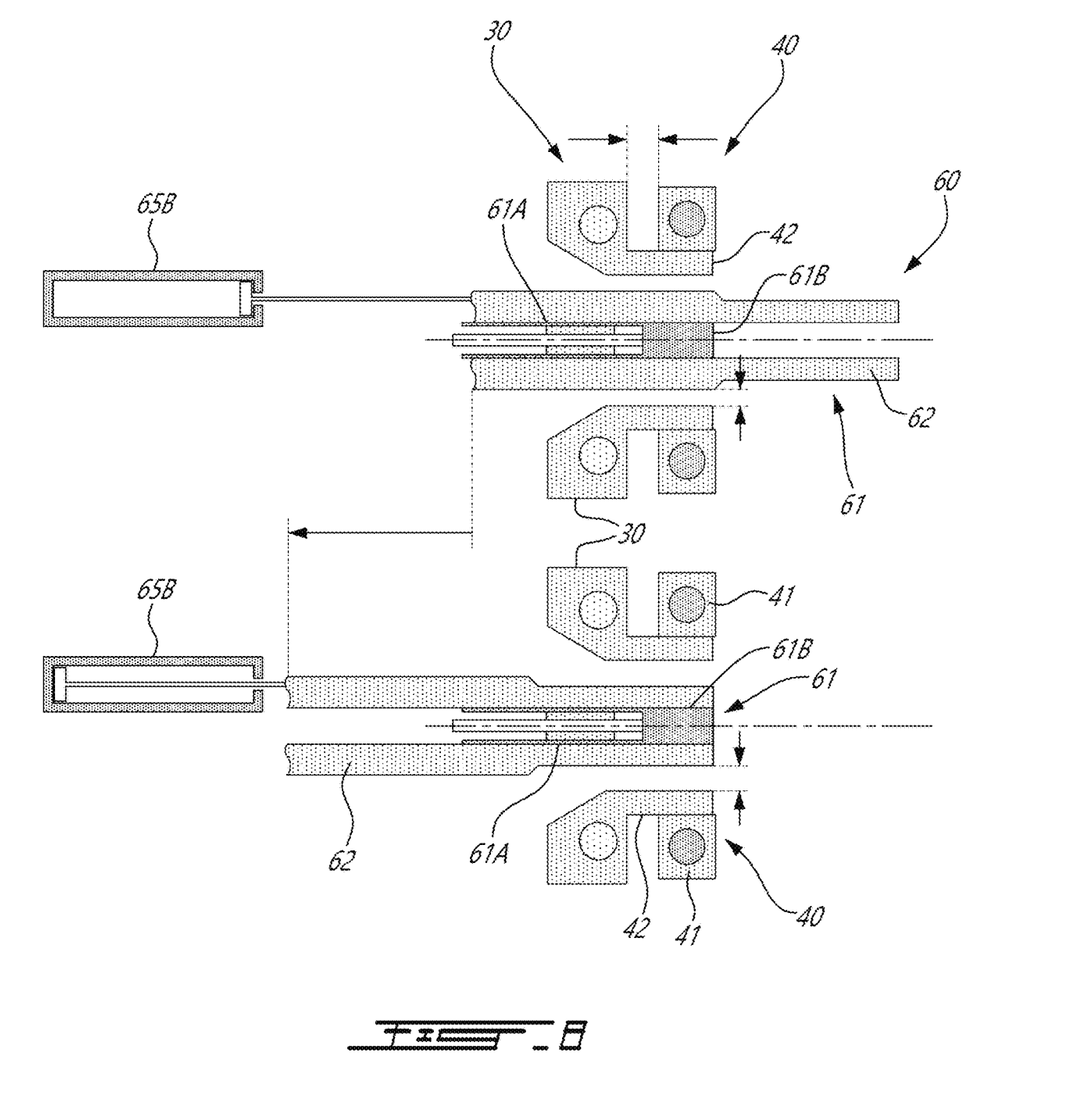
FIG. 8 is a schematic view of the pultrusion module and cooling module as part of the pultrusion system of FIG. 1, with a pultrusion mandrel having two different cross-sectional shapes.

Referring to FIG. 8, the forming sheath 62 of the pultrusion mandrel 60 may have geometry variations along its longitudinal axis (i.e., parallel to the pultrusion process direction). For example, in FIG. 8, the forming sheath 62 has two different diameters, for instance with a taper (e.g., frusto-conical segment) or like smooth transition between the two diameters. The forming sheath 62 may be moved during pultrusion to adjust the hollow pultruded profile's thickness. The cross-sectional shapes of the forming sheath 62 may be the same, but may also vary.

Although different dimensions are possible, the cooling channel 42A is a 140 mm long segment with a constant diameter of 4.78 mm, to be put in perspective with the dimensions of the other preform passages of the system 10.

Figure 5:
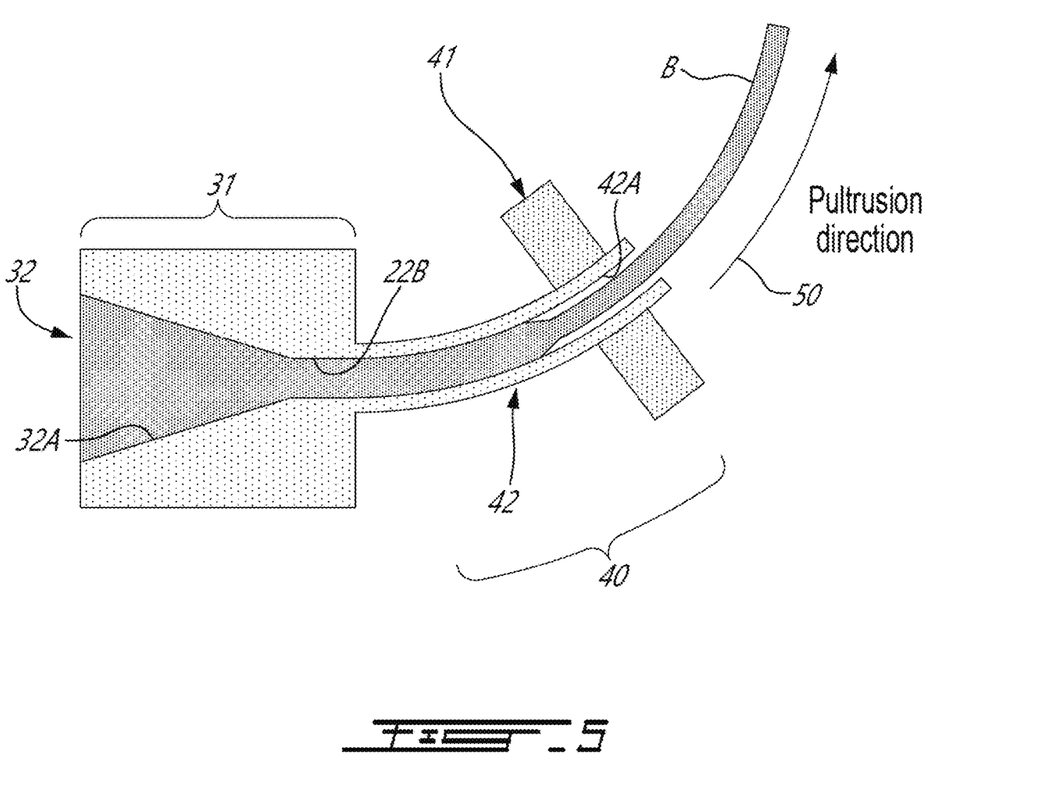
FIG. 5 is a schematic view of a pultrusion module and curved cooling module as part of the pultrusion system of FIG. 1

Referring to FIG. 5, the cooling tube 42 and/or cooling channel 42A can be bent to pultrude a curved pultrusion product. In the illustrated embodiment, the curvature occurs directly downstream of the pultrusion die 31, and extends all the way to the downstream end of the cooling channel 42A.

The pulling mechanism 50 is located at the outlet of the cooling module 40 to exert the pulling action on yarns A. The pulling mechanism 50 may have any appropriate embodiment. For example, the pulling mechanism 50 may include multiple pairs of opposing rollers (FIG. 1) between which the pultruded beam is squeezed. The superior rollers may be actuated by an electric motor, the inferior ones are free wheels, or vice-versa. A rotary encoder may be used to monitor the pultrusion speed. Load cells may also be placed between the pulling mechanism 50 and the module 40 of the system 10 to measure the pulling force on the beam. The pulling mechanism can also be a reciprocating puller, in which two clamps are moving to pull, one after the other, the beam.

In operation, the yarns A are continuously pulled by the pulling mechanism 50, through the various modules of the system 10. The thermoplastic matrix and natural fibers or synthetic fibers are gradually and uniformly pre-heated in the pre-heating module 20, if present, to approach impregnation temperatures, at which the viscosity of the resin of the thermoplastic matrix will be at or near its minimum. The preheating initiating the impregnation and lowering void content in the preform. In the impregnation module 30, the preform reaches this impregnation temperature, while being exposed to a reduction in diameter. There results a consolidating pressure in the resin, by which the resin will impregnate the natural fibers. The impregnation of the natural fibers is the soaking and saturating of the natural fibers with the resin, with resin penetration between fiber filaments. It is observed that the system 10 allows impregnation without air pressure beyond ambient. The intervening step of vacuuming the preform, in the vacuum die if present, between the two reductions in diameter of the pultrusion dies 31 if multiple pultrusion dies 31 are present, allows removal of air from the resin heated to low or minimum viscosity, and likely the deconsolidation of the preform. The deconsolidation preform has air-evacuation pathways to facilitate air removal from the pre-form. The removal of air, and the subsequent expose to diameter reduction while impregnation temperatures are maintained, allows the beam to reach a desired cross-sectional diameter, with reduced air content (less than 10%). The cooling of the resulting beam allows same to stabilize into its resulting dimension and shape.

There results a pultruded beam comprising a thermoplastic matrix reinforced with natural fibers, the pultruded beam having a void percentage lower than 10% of an overall volume of the pultruded beam, and further wherein the natural fibers constitute between 40% and 60% of an overall volume of the pultruded beam.

Other than the use of the pultruded beams directly as components, other uses for the pultruded beams include pultruded insert overmolded with thermoplastic resin, injection precursor with oriented pellets, and compression molding precursor, with oriented strands, for instance to form panels incorporating randomly oriented stands.

Consequently, the arrangement of a cooling tube 42 between the dies 31 and 41 may improve the overall surface finish as well as the impregnation quality in thermoplastic pultrusions. The cooling tube 42 may prevent composite deconsolidation since cooling to a rigid state is made when the material is constrained between surfaces. This allows an enhanced control on the beam shape and dimension. Moreover, the cooling tube 42 may cause a lower void content since no voids are reintroduced in a deconsolidation of the beams. The cooling tube 42 may limit the temperature interference between the dies 31 and 41 since there is less material to conduct heat. This improves the energy efficiency of the system.

The arrangement of cooling die 31 and cooling tube 42 may also allow the hot molten polymer mixture to cool relatively rapidly, therefore limiting adhesion forces. This effectively reduces the pulling forces at the pulling mechanism 50.

In the embodiments of FIGS. 2 and 5, in which the cooling tube 42 extends through and beyond the cooling device 41, the position of the cooling device 41 onto the cooling tube 42 may be modified towards or away from the pultrusion die 31 by sliding the cooling device 41. Such an adjustment of the relative position of the die 31 and device 41 may be performed as a function of the pultrusion speeds, material properties and process temperatures. In such an embodiment, the cooling thermal profile can be modified to tailor the crystallinity content in semi-crystalline polymers.

Another benefit from a more rapid cooling is the thermal shrinkage of the pultruded component along its cross-sectional dimensions. As schematically shown in FIGS. 2-5, the thermal shrinkage will result in the pultruded component being smaller than the dimensions of the cooling channel 42A. This effectively creates a small separation between the pultruded component B and the surface of the cooling channel 42A, therefore reducing the pultruded component to die surface friction. This effectively reduces the pultrusion pulling forces.

A method for pultruding a hollow beam may include any of: continuously pulling on a preform of yarns including a thermoplastic matrix and fibers; while continuously pulling, sequentially passing the preform through at least one pultrusion first die having a straight or tapering channel portion heated such that the preform reaches a desired low viscosity temperature for resin in the thermoplastic matrix to impregnate the fibers, also passing around a mandrel having a straight, tapered or expanding cross-section, passing around the mandrel having a heated and a cooled section along the length, passing the preform in cooling tube downstream of the pultrusion die, passing the preform in the cooling module 40.

Exemplary Embodiment

Figure 4:
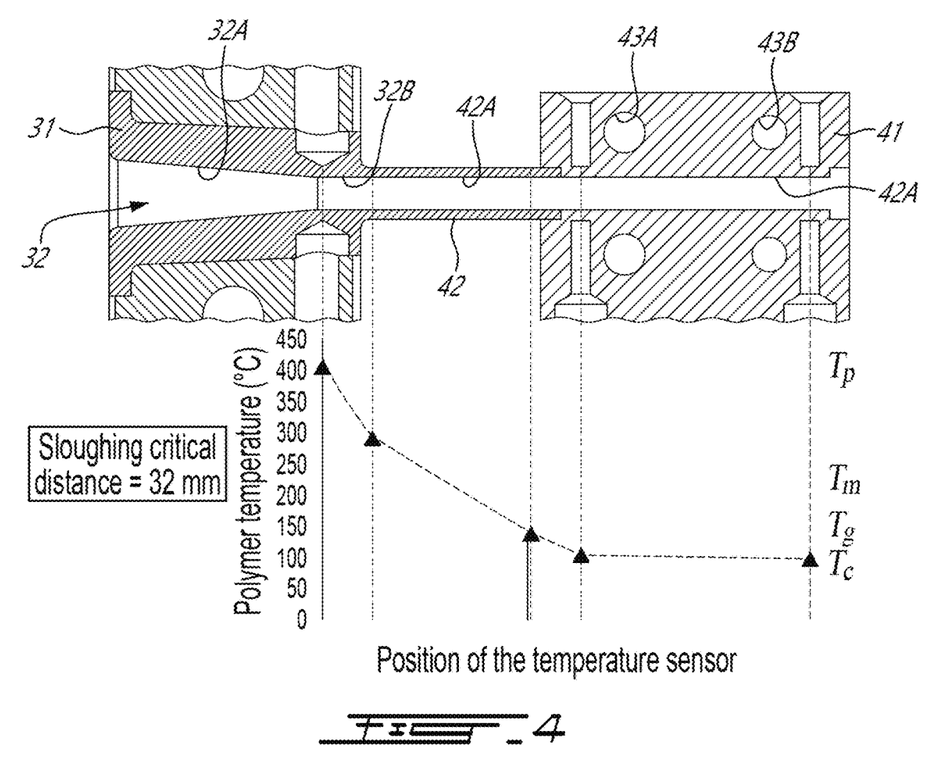
FIG. 4 is a zoomed view of the cooling temperatures in the example of FIG. 4.

FIGS. 3 and 4 show actual temperature measures during a C/PEI pultrusion experiment, given solely as an example. The temperatures were measured by inserting a wire-thermocouple in the middle of C/PEI pre-consolidated precursor and pulled with the material along the pultrusion line. During this pultrusion experiment, $T_p$ was set at 380° C. and pulling speed was set at a low speed of 50 mm/min. The pre-heater temperature was set at 200° C. PEI is an amorphous polymer. Its $T_g$ is around 210° C. $T_c$ was set at 109° C., which is, a temperature below $T_g$. As can been seen in the figure, a sloughing critical zone was 25.0 mm. The sloughing critical zone can be defined as a zone where the polymer is in contact with the cooling tube and where the polymer is cooler than Tp while still hotter than Tg. Within this zone, the polymer can adhere to the cooling tube and break-off from the pultruded composite. The broken polymer chunk then acts as a fixed mechanical feature plowing in the moving pultruded beam. The defect created is called sloughing. The pultruded beam also left the cooling at a temperature below $T_g$. This prevented any potential deconsolidation after leaving the cooling device.

Based on these surface measurements, it can be assumed that the temperature drops rapidly under $T_g$ while the material is still in the cooling tube 42. This high cooling rate results in a shorter sloughing-critical distance of approximately 32 mm.

The invention claimed is:

1. A system for pultruding a beam comprising:
a pulling mechanism continuously pulling on a preform of yarns including a thermoplastic matrix and fibers, the pulling mechanism being downstream in the system; and
a sequence of
at least one pultrusion die having a tapering channel portion heated such that the preform is at a desired low viscosity temperature for resin in the thermoplastic matrix to impregnate the fibers,
a cooling tube at a downstream end of the pultrusion die, and
a cooling module spaced from the pultrusion die by the cooling tube, the cooling module to cool the cooling tube before the preform reaches the pulling mechanism, wherein the cooling tube defines a cooling channel, the cooling module being displaceable along the cooling tube to vary a distance between the cooling module and at the at least one pultrusion die.

2. The system according to claim 1, wherein the pulling mechanism comprises at least a pair of roller on opposite sides of the beam.

3. The system according to claim 1, further including a pre-heating module to pre-heat the preform upstream of the at least one pultrusion die.

4. The system according to claim 1, wherein the at least one pultrusion die includes a first pultrusion die, a vacuum module having a vacuum cavity to remove air from the preform exiting the first die, and at least a second pultrusion die to further impregnate the fibers.

5. The system according to claim 1, wherein the at least one pultrusion die has a taper in a range of 2° to 6° from a central axis of the tapering channel portion.

6. The system according to claim 1, wherein the at least one pultrusion die includes a straight channel portion downstream of the tapering channel portion.

7. The system according to claim 1, wherein the cooling tube is exposed to ambient.

8. The system according to claim 1, further including at least one actuator to displace the cooling module relative to the cooling tube.

9. The system according to claim 1, wherein the cooling tube extends through the cooling module.

10. The system according to claim 1, wherein a longitudinal axis of the cooling tube is curved.

11. The system according to claim 1, wherein the cooling tube is integrally connected to the pultrusion die and extends therefrom.

12. The system according to claim 1, wherein the cooling module has at least one block defining another cooling channel, and wherein heating cartridges are in the at least one block.

13. The system according to claim 1, including a pultrusion mandrel extending in the at least one pultrusion die and the cooling channel.

14. The system according to claim 13, wherein the pultrusion mandrel has a thermal management core inside a forming sheath.

15. The system according to claim 13, wherein the pultrusion mandrel has a variation of cross section.

16. A system for pultruding a beam comprising:
a pulling mechanism continuously pulling on a preform of yarns including a thermoplastic matrix and fibers, the pulling mechanism being downstream in the system; and
a sequence of
at least one pultrusion die having a tapering channel portion heated such that the preform is at a desired low viscosity temperature for resin in the thermoplastic matrix to impregnate the fibers,
a cooling tube at a downstream end of the pultrusion die,
a cooling module spaced from the pultrusion die by the cooling tube, the cooling module to cool the cooling tube before the preform reaches the pulling mechanism, wherein the cooling tube defines a cooling channel, and
a pultrusion mandrel extending in the at least one pultrusion die and the cooling channel the pultrusion mandrel having a thermal management core inside a forming sheath, and the thermal management core having a heating element forming a heating zone and a cooling element forming a cooling zone.

17. The system according to claim 16, including an actuator for displacing the pultrusion mandrel relative to the pultrusion die and to the cooling channel.

18. A system for pultruding a beam comprising:
a pulling mechanism continuously pulling on a preform of yarns including a thermoplastic matrix and fibers, the pulling mechanism being downstream in the system; and
a sequence of
a pre-heating module to pre-heat the preform,
at least one pultrusion die having a tapering channel portion heated such that the preform is at a desired low viscosity temperature for resin in the thermoplastic matrix to impregnate the fibers,
a cooling module to cool the beam before the beam reaches the pulling mechanism,
a pultrusion mandrel through the system, the pultrusion mandrel having a thermal management core inside a forming sheath, the thermal management core having a heating element forming a heating zone and a cooling element forming a cooling zone; and
an actuator for displacing the pultrusion mandrel relative to the pultrusion die and to the cooling channel.

* * * * *